US009497424B2

(12) United States Patent
Kosseifi et al.

(10) Patent No.: US 9,497,424 B2
(45) Date of Patent: Nov. 15, 2016

(54) SYSTEM AND METHOD FOR PROCESSING STREAMING MEDIA OF AN EVENT CAPTURED BY NEARBY MOBILE PHONES

(71) Applicant: AT&T Mobility II, LLC, Atlanta, GA (US)

(72) Inventors: Mario Kosseifi, Roswell, GA (US); Shravari Abnave, Alpharetta, GA (US); Jeremy Fix, Acworth, GA (US); Sheldon Kent Meredith, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 448 days.

(21) Appl. No.: 13/705,900

(22) Filed: Dec. 5, 2012

(65) Prior Publication Data

US 2014/0152834 A1    Jun. 5, 2014

(51) Int. Cl.
*H04N 21/2187*    (2011.01)
*H04N 21/218*    (2011.01)
*H04N 7/18*    (2006.01)

(52) U.S. Cl.
CPC .......... *H04N 7/181* (2013.01); *H04N 21/2187* (2013.01); *H04N 21/21805* (2013.01)

(58) Field of Classification Search
CPC .......... H04N 7/181; H04N 21/21805; H04N 21/2187
See application file for complete search history.

(56) References Cited

U.S. PATENT DOCUMENTS

| | | | |
|---|---|---|---|
| 6,522,352 B1 * | 2/2003 | Strandwitz et al. | 348/211.2 |
| 6,738,361 B1 * | 5/2004 | Immonen | H04L 12/5695 370/328 |
| 7,272,657 B2 * | 9/2007 | Allen et al. | 709/231 |
| 7,818,444 B2 * | 10/2010 | Brueck | H04L 29/06027 709/231 |
| 8,065,709 B2 * | 11/2011 | Tischer et al. | 725/105 |
| 2006/0195882 A1 * | 8/2006 | Tischer | H04N 7/16 725/116 |
| 2009/0089352 A1 * | 4/2009 | Davis | G06Q 10/00 709/201 |
| 2012/0270576 A1 | 10/2012 | Herrington et al. | |
| 2012/0284755 A1 | 11/2012 | Keret et al. | |
| 2013/0091249 A1 * | 4/2013 | McHugh | H04N 21/23439 709/219 |

OTHER PUBLICATIONS

Yilin Zhao, "Mobile Phone Location Determination and Its Impact on Intelligent Transportation Systems," IEEE Transactions on Intelligent Transportation Systems, vol. 1, No. 1, Mar. 2000, pp. 55-64.*
Yilin Zhao, "Mobile Phone Location Determination and Its Impact on Intelligent Transportation Systems," IEEE TRansactions on Intelligent Transportation Systems, vol. 1, Mar. 2000, pp. 55-64.*

* cited by examiner

*Primary Examiner* — Thai Tran
*Assistant Examiner* — Christopher T Braniff
(74) *Attorney, Agent, or Firm* — Guntin & Gust, PLC; Robert Gingher

(57) ABSTRACT

Systems, processes and computer-readable media that incorporate the subject disclosure may include, for example, the establishment of wireless communications with a wireless communications device positioned for monitoring an event. A media stream including event media is received from the wireless communications device. The event media is generated by the wireless communications device obtained from the observation position. The media stream is forwarded to a media production processor. Upon selection, the media production processor uses the media stream to prepare media program coverage of the event. Other embodiments are disclosed.

19 Claims, 7 Drawing Sheets

300

SYSTEM AND METHOD FOR PROCESSING STREAMING MEDIA OF AN EVENT CAPTURED BY NEARBY MOBILE PHONES

FIELD OF THE DISCLOSURE

The subject disclosure relates generally to the delivery of streaming media obtained from wireless sources and more particularly to the delivery of streaming video obtained from mobile phones to a video production facility.

BACKGROUND

Video coverage of an event, such as a major sporting event, generally requires a substantial investment in both planning and resources. Events can include critical actions that occur at various times and locations during the course of an event, such that the focus of coverage switches from one location to another with minimal delay. Some examples of venues hosting events that are routinely covered by broadcasters include sporting arenas, stadiums, and winter venues, such as ski and snowboarding jumps and race courses.

A broadcast network covering such events typically requires multiple cameras at various locations to ensure that a sufficient quality of coverage can be provided at a particular venue. Multiple cameras provide simultaneous video coverage from positions that may be fixed or mobile during the course of the event. Such overlapping coverage of an event allows broadcast producers to alternatively select video segments from among the different video feeds as may be beneficial according to a natural and sometimes unanticipated progression of the event.

In addition to provisioning multiple cameras, preparation for a covered event may require a satellite broadcast terminal. This would be particularly true for live coverage of the event. The satellite broadcast terminal allows for a relay of video from one or more of the cameras to a media production facility, which produces programmed coverage for broadcast viewers. Consequently, additional communications infrastructure is also used to, for example, interconnecting the cameras to the satellite terminal and to provide power, control and the like. Even with such elaborate preparations, coverage of a particular turn of events may be from an inferior vantage point or missed altogether.

BRIEF DESCRIPTION OF THE DRAWINGS

Reference will now be made to the accompanying drawings, which are not necessarily drawn to scale, and wherein.

DETAILED DESCRIPTION

Figure 1:
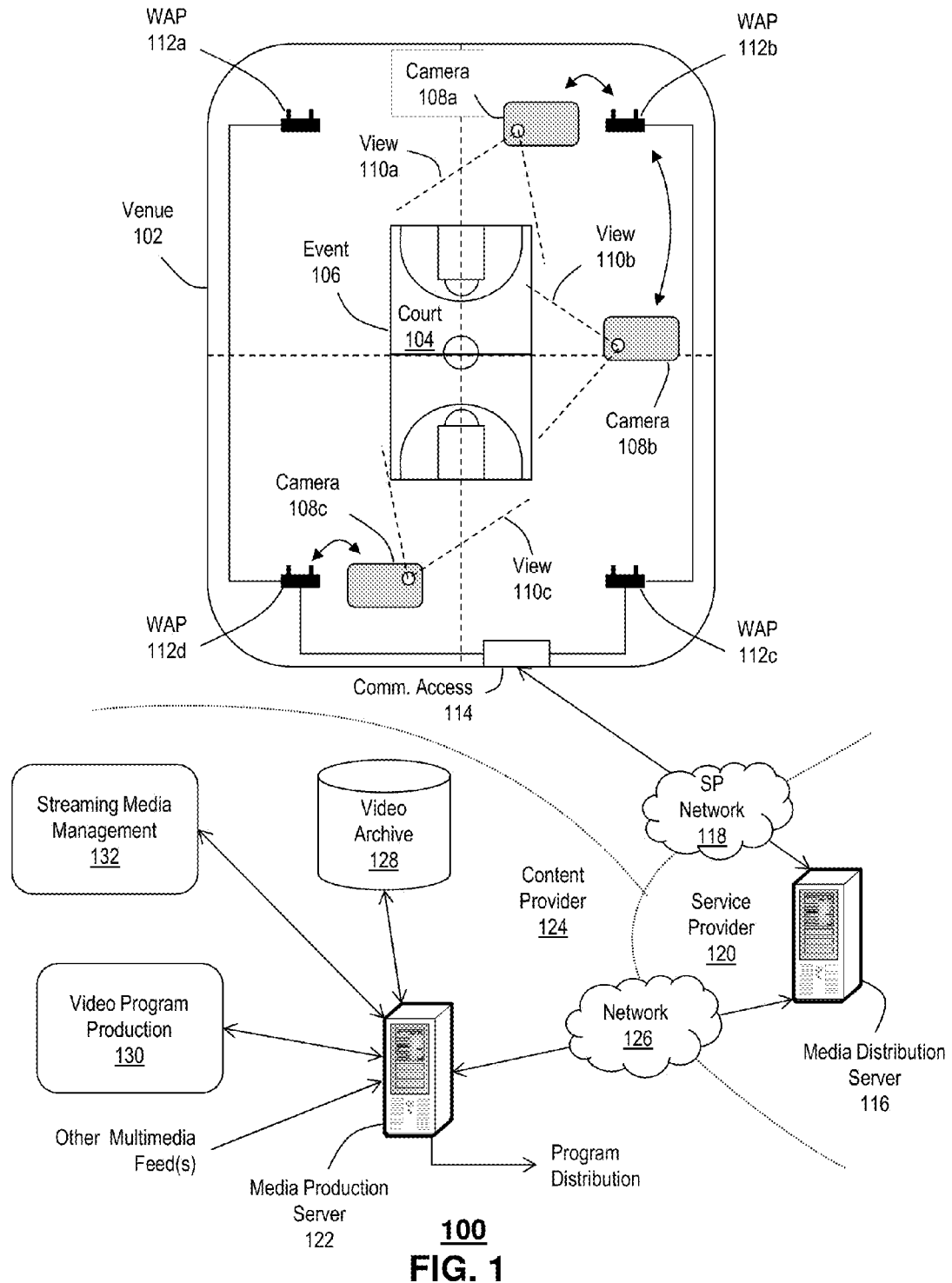
FIG. 1 depicts an illustrative embodiment of an event monitoring system.

The subject disclosure describes, among other things, illustrative embodiments of systems and processes supporting the delivery of streaming media, such as streaming video, obtained from one or more wireless communications devices, such as mobile phones of spectators at an event. The streaming media can be delivered to a media production facility, such as a broadcast network production facility. The media production facility can observe samples of streaming media feeds from multiple wireless communications devices at a particular venue during a covered event. The media production facility can select video segments from among the coverage offered by streaming media feeds from the various different vantage points of the spectator subscribers for inclusion in video program coverage of the event. Other embodiments are included in the subject disclosure.

One embodiment of the subject disclosure includes a process, which includes establishing, by a system including a processor, wireless communications with a mobile phone. An observation position is determined of the mobile phone relative to an event. The mobile phone is equipped with a video camera and generates event video of the event, which is obtained from the observation position. A video stream is received by the system from the mobile phone, wherein the video stream includes the event video. The observation position of the mobile phone is forwarded by the system to a media production processor. The video stream is also forwarded by the system to the media production processor, which uses the video stream to prepare programmed video coverage of the event.

Another embodiment of the subject disclosure includes a device, including a memory to store computer instructions, and a processor coupled to the memory. The processor, responsive to executing the computer instructions, performs operations including establishing wireless communications with a wireless communications device. An observation position is determined of the wireless communications device relative to an event. The wireless communications device generates event media of the event monitored from the observation position. A media stream, which includes event media, is received from the wireless communications device. The observation position of the wireless communications device and the media stream are forwarded by the system to the media production processor, which uses the media stream to prepare programmed media coverage of the event.

Yet another embodiment of the subject disclosure includes a computer-readable storage medium, which includes computer instructions. The computer instructions, responsive to being executed by a processor, cause the processor to perform operations including determining an observation position of a mobile phone relative to an event. The mobile phone generates event video of the event monitored from the observation position. A video stream is received from the mobile phone, wherein the video stream comprises the event video. The video stream is forwarded to a media production processor, which uses the video stream to prepare video program coverage of the event.

FIG. 1 depicts an illustrative embodiment of an event monitoring system 100. For the purposes of illustration, the venue 102 is a basketball arena, including a basketball court 104 upon which a basketball game is played, referred to as an event 106. Other areas of the venue 102 surrounding the basketball court 104 include seating, aisles and other common areas where spectators may be located during the course of the event 106. The spectators can be stationary, for example seated within a reserved seat, or mobile, for example, walking along an aisle or other common area of the venue 102, during the event 106.

Many spectators own wireless communications devices, such as mobile phones 108a, 108b, 108c (generally 108). It is also common for such spectators to have access to their mobile phones 108 during the course of the event 106. Such phones 108 can include other features, including sensor devices, such as still cameras, video cameras, and audio recorders. Indeed, many spectators use their devices to capture media during the course of the event 106. Examples include audiovisual clips or still pictures obtained for commemorating attendance at the event 106 and sharing aspects of the event 106 with friends and family members.

Spectators at the event 106 can be located anywhere within an expansive region of the venue 102, which can provide a wide choice of vantage points for viewing the events 106. A particular spectator's media captured during the event 106 is representative of the spectator's vantage point. By way of illustration, a camera of a first mobile phone 108a is positioned at a first location to capture a first view 110a of the event 106. Likewise, second and third cameras of second and third mobile phones 108b, 108c are positioned respectively at second and third locations, providing second and third views 110b, 110c of the event 106. Generally, a particular one of the different views 110a, 110b, 110c (generally 110) represents a preferable view 110 for the event 106 at any given moment. Consider a "fast break" heading towards the upper net of the basketball court 104. For this play, the second camera of the mobile phone 108b may provide an advantageous view 110b of the play as it initially unfolds with a quick pass towards the net. Likewise, the first camera of the first mobile phone 108a may provide an advantageous view 110a of the play as it concludes with a "dunk."

In at least some embodiments the venue 102 includes one or more wireless access points or terminals 112a, 112b, 112c, 112d (generally 112). The wireless access terminals 112 can be positioned to provide suitable wireless communications coverage to spectators within the venue 102. Such coverage can allow for telephone conversations, text messaging, paging, access to mobile applications, such as web browsing, and the like throughout the venue 102. In the illustrative example and without limitation, four such wireless access terminals 112 are located within respective quadrants of the venue 102.

It is conceivable that acceptable wireless communications may be provided by one or more of the wireless access terminals 112 to a particular spectator-subscriber. It is also generally understood that wireless signals are typically strongest along a shortest path length, notwithstanding other radio interference, multiplath effects, and the like. Thus, it may be preferable in at least some circumstances for a spectator to communicate with a nearest wireless access terminal 112. In the illustrative example, the first wireless communications device including the camera of the first mobile phone 108a is connected with the second wireless access terminal 112b, as it represents the shortest path being within the same quadrant. The second wireless communications device including the second camera of the second mobile phone 108b is also connected to the second wireless access terminal 112, as it too is within the same quadrant. The third wireless communications device including the third camera of the third mobile phone 108c is connected to the fourth wireless access terminal 112d as they are located with the fourth quadrant.

The wireless access terminals 112 can be connected to a broadband access terminal 114, such as an optical network terminal providing broadband access to a service provider network 118 comprising an optical fiber backbone network. Connectivity within the venue 102 can be provided by wireless communications techniques, or wired techniques, for example, according to cables supporting an exchange of messages by way of a networking protocol, such as an Ethernet protocol. The broadband access terminal 114 can be communicatively coupled to a media distribution server 116, for example, through a dedicated service provider network 118. Alternatively or in addition, communications connectivity can be provided with one or more other networks, such as a public switched telephone network, a satellite network, a terrestrial radio network, such as cellular radio network, and other wide area networks, such as the Internet.

The media distribution server 116 can be remotely located from the venue 102, for example, at facilities under network service provider facilities 120. The media distribution server 116 can be communicatively coupled to a media production server 122, for example, located at content provider facilities 124. In at least some implementations the media distribution server 116 and the media production server 122 are remote with respect to each other and with respect to the venue 102. The media production server 122 can be communicatively coupled to the media distribution server 116, for example, through the dedicated service provider network 118, or through a separate network 126, as shown. The network 126 can include one or more of a public switched telephone network, a satellite network, a terrestrial radio network, such as cellular radio network, and other wide area networks, such as the Internet.

One or more of streaming video, still photos, and streaming audio captured by one or more of the cameras of spectators' mobile phones 108 can be routed through the wireless access terminals 112, to the venue's broadband access terminal 114 and ultimately to the media distribution server 116 through the service provider's network 118. The service provider facilities 120, in turn, can forward at least some of the streaming video, still photos and audio to the content provider facilities 124, for example, through the network 126 for further processing by the media production server 122. For example, a producer at the content provider facilities 124 can choose from one or more sample streaming media channels provided by the media distribution server 116. Each channel of the streaming media channels can represent streaming media obtained from a respective one of the cameras of the mobile phones 108 at the event 106.

In some embodiments, an approximation of a location or vantage point of a camera of the mobile phone 108 can be inferred from the particular wireless access terminal 112 through which the mobile phone 108 including the camera is communicating. The position of the mobile phone 108 including the camera associated with a respective one of the multimedia channels can also be obtained or otherwise determined by the media distribution server 116 and forwarded to the media production server 122, to facilitate organization and selection of particular streaming media channels during the production of programmed media of the event 106.

A greater or fewer number of wireless access terminals 112 can be provided at any particular event 106 based on various factors, such as the configuration of the venue 102, the nature of the event 106, the number of anticipated wireless communications subscribers, etc. As it is also possible for a particular mobile phone 108 including a camera in one region 212 to communicate through a wireless access terminal 112 in another region 212, it is therefore advantages to provide other techniques for determining or otherwise approximating a location of a spectator at any given moment. In one scenario, a spectator, for example through a mobile application, manually enters their position. An indication of a position might be provided by identification of a reserved seat of the particular spectator (e.g., section, row, seat number). As this position would remain fixed during the course of the event 106, it may not be suitable for a spectator that chooses to monitor the event 106 from a different vantage point. A position can also be obtained by manual entry of a section number or other suitable venue reference within which the spectator is positioned during the course of the event 106, allowing for spectators to roam through a venue 102 during the course of the event 106, while periodically updating their position.

Automated techniques for detecting a position of a spectator can include an automated response by the wireless communications device of its location, for example as determined by a global positioning service (GPS) receiver. Location can also be determined at least in part by signal processing of the wireless signals between a particular mobile phone 108 and one or more of the wireless access terminals 112. Such techniques can include estimating a range to the device according to signal delay, and triangulating a position of the device by respective ranges from each of more than one wireless access terminal 112. Still other techniques can include registering the mobile phone 108 by use of a radio frequency identification tag and tag reader, each associated with a respective one of the mobile phone 108 and a location within the venue 102. Still other techniques can include near field registration techniques and estimation from the video itself. Such estimations can be accomplished manually or automatically through image recognition techniques at one or more of the service provider facilities 120 and the content provider facilities 124.

The media production server 122 at the content provider facilities 124 can also receive multimedia from one or more other sources, such as video feeds from cameras provisioned by the content provider at the event 106, and multimedia from other sources including archived video 127 as can be obtained from a video archive source 128. The media production server 122 can provide one or more display consoles allowing video production operations to monitor multiple streaming media feeds from various sources during the course of the event 106. The video production operators can choose from among the various choices which streaming media segment will be incorporated into a production version of the program. Example consoles include video production consoles 130, including one or more video monitors or displays showing, for example, independent or combined displays of one or more content provider provisioned cameras. One or more media management console displays 132 can include streaming media obtained from one or more cameras of one or more spectator mobile phones 108 providing coverage of the same event 106. It is conceivable that video from provisioned cameras can be combined with video from the cameras of the mobile phones 108 on a single console.

Thus, coverage of an event 106 can include video segments obtained from one or more of the provisioned cameras, cameras of spectator mobile phones 108, archived video 127, and the like, joined or otherwise combined into a coherent video production of the event 106. The production program can be forwarded by the media production server 122 to broadcast facilities for dissemination and broadcast to one or more video consumer markets.

It is conceivable that a large number of spectators may choose to simultaneously participate by providing streaming media from cameras of their mobile phones 108 during the same event 106. A major sporting event 106 can include tens of thousands of spectators, many of which own mobile phones 108 that include cameras and video cameras. Participation can be encouraged or otherwise rewarded for streaming media contributions by any of various reward programs. One such program might offer spectator-subscribers free minutes, or other discounts related to their mobile service contract (e.g., a free video on demand rental or purchase). Other rewards can include coupons or discounts, for example, at the venue 102 for food, drink, souvenirs and the price of tickets to future events 106, or other participating retail outlets.

The distribution or accrual of such rewards can be determined by any combination of tracked minutes of streaming media offered by the spectator, tracked minutes of streaming media forwarded by the media distribution server 116 to the media production server 122, and tracked minutes of forwarded streaming media actually included into a video production of the event 106. The media distribution server 116 may perform some level of filtering, thereby forwarding a subset of received multimedia streams to the media production server 122.

For example, the media distribution server 116 can select for forwarding a representative sample of received multimedia streams from each of a number of venue regions 212. A forwarded number of multimedia streams for forwarding can be set at a fixed or maximum number, such as four, six, ten, one hundred, and so on. For a maximum number of forwarded multimedia streams set at 12, filtering can select two left mid-court, two right mid-court, and two at each of the four corners near each basket of a basketball court 104. If more than two multimedia streams are received from any of the venue regions 212, the media distribution server 116 can apply filtering so that some of the received multimedia streams are not forwarded.

Alternatively or in addition, the media distribution server 116 can filter based on position within any of the venue regions 212. For example, if there are multiple media streams received from a particular region of the venue, the multimedia distribution server 116 can select some of the media streams based on a position within each region of the venue. Filtering can be applied, for example, to select one or more multimedia streams from a relatively close vantage point, as in near the floor, and/or from a higher vantage point further away from the court 104.

Other filtering decisions can be based on other aspects, such as a quality of the video (e.g., resolution) or quality of communications, e.g., a channel quality indicator of the wireless communications link between the wireless access terminal and the mobile phone. Still further decisions can be based on prior usage, for example, selectively forwarding or not forwarding media streams received from mobile phones 108 used previously according to a measure, such as success, quality, etc.

Other rewards might include attribution of video segments to the contributing spectator, by way of publicizing their name, pseudo name, or other indicator, such as an identification used by the spectator in the context of social media. Such contributing spectator identifiers can be included during any contributing segment included in the video production, for example, by on-screen text as in a textual overlay, captioning or a watermark. Alternatively or in addition, such contributing spectator identifiers can be included in a credits portion of the program, typically broadcast at the conclusion of the program. Contributions can also be tracked and otherwise publicized by one or more of the media service provider and the content provider facilities 124 by reserved web pages dedicated to identifying contributing individuals and information relating to their contributions, such as the total contributed time, the maximum contributed time for a single event 106, etc.

It is beneficial that streaming media forwarded by the media production server 122 be presented to the video program producers in an organized manner. It is conceivable that a large number of spectators may wish to contribute streaming media content during the event 106. Accordingly, organization of a presentation of the streaming media content will facilitate adoption and popularity of the program by the media producers. In particular, producers can benefit from a presentation of streaming media that is organized according to one or more features or attributes. Such features and attributes can include a vantage point or location of the video stream, a quality of the video stream, reliability of the video stream, and the like. For example, streaming media received from vantage points at a favorable location, such as close to a basketball court 104, can be presented or otherwise ranked in a more prominent manner, such as at a top of a list of streaming media samples 202. Other features or attributes suitable for ranking, include video quality, communications quality, and prior experience with the same user of the mobile phone 108. Higher rankings can be displayed, for example, in a preferred region of a display, such as at a top portion of the display.

Figure 2:
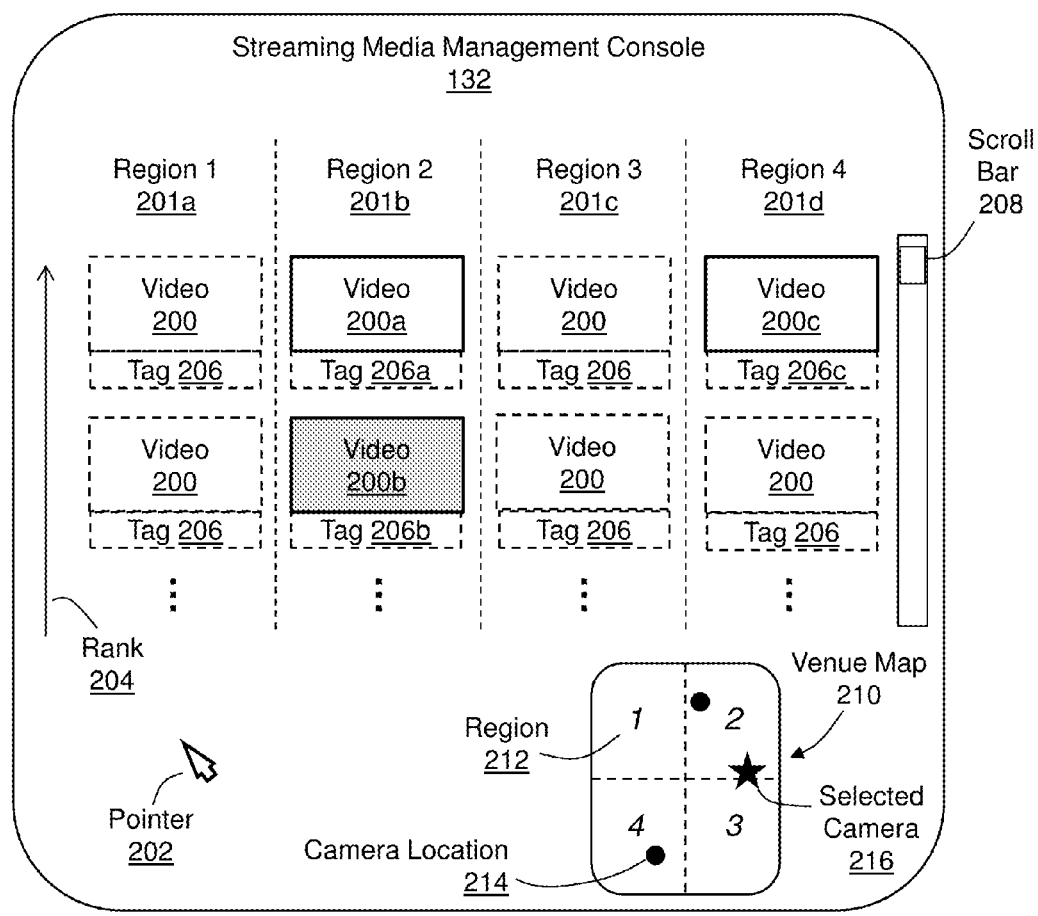
FIG. 2 depicts in more detail an illustrative embodiment of a streaming media management console in the event monitoring system of FIG. 1.

FIG. 2 depicts an illustrative embodiment of a streaming media management console display 132. By way of example, a group of streaming media samples 200 can be simultaneously displayed on the streaming media management console display 132. The streaming media samples 200 can include a full quality and full sized version of the streaming media, or in at least some instances, a sample reduced in one or more of quality and size. The control of such features can be provided by video compression algorithms, such as MPEG and JPEG. Provision of samples reduced in one or more of size and quality generally consume less channel bandwidth and thereby preserve bandwidth of the wireless access terminals 112 and communications facilities 118, 126 (FIG. 1), providing a relatively low bandwidth streaming media sample 200 compared to streaming media available from the mobile phone 108. To the extent that the multimedia samples are provided with reduced quality and size, a video producer can select one or more of the streaming media samples 200 for subsequent presentation at a higher quality and greater size (e.g., a relatively high bandwidth of the streaming media obtained from the mobile phone 108). Selection can be made, for example, with a pointer icon 202 that can be manipulated by an operator at the content provider facilities 124 that can include a video production facility. A mouse, joystick, trackball, keyboard, touchscreen or other suitable user interface can support repositioning of the pointer icon 202. Once positioned over an element of the media management console display 132, an operator selection can be made through any of a number of suitable techniques.

As shown in the illustrative example, the streaming media samples 200 can be organized or otherwise grouped according to vantage point. In the illustrative example, the venue 102 was equipped with four wireless access terminals 112, covering four respective regions 212 within the venue 102 and providing different vantage points. The corresponding streaming media management console display includes four display regions 201a, 201b, 201c, 201d (generally 201) corresponding to regions 212 of the venue 102. The display regions 201 can be columns, as shown, rows, or any other suitable arrangement, e.g., tabbed pages, that can be easily distinguished by a video producer.

In at least some embodiments, one or more other features are used in the organization and presentation of streaming media samples 200. For example, the streaming media results can be ordered within each of the different display regions 201 according to a ranking 204. The ranking can be determined from one or more features, such as quality of the streaming media, communications channel quality, reliability, and historical information related to the contributing spectator. As to the last feature, a contributing spectator whose content has been used on previous occasions with acceptable result can be granted a higher rank than a new contributor or a prior contributor providing substandard or otherwise inferior service. Such rankings 204 can be generated at the media distribution server 116, the media production server 122, a separate ranking server at the service provider facilities 120, a separate ranking server at the content provider facilities 124, and combinations of any such servers. Weighting values can be associated with each of the different features or dimensions contributing to an overall ranking.

Display of streaming media samples 200 can be ordered such that higher ranking results are displayed in a more prominent manner. For example, higher ranking results can be provided towards a top portion of a column of streaming media samples 200. In at least some embodiments, a scroll bar 208 or similar feature can be provided to allow a video producer to scroll or "swipe" through an extended list of streaming media samples 200. It is conceivable that there will be at times more streaming media samples 200 than can be reasonable displayed on the streaming media management console display 132.

One or more of the streaming media samples 200 can optionally include supplemental information, such as a tag 206 illustrated in relation to the streaming media sample 200. The tag can include textual information such as an identification of the contributing spectator, a rank of the streaming media, camera or phone features or capabilities, a current zoom value, a location of the phone, other factors contributing to one or more of quality or rank. Alternatively or in addition, the tag can include graphical elements, such as a color or shape indicative of one or more of the aforementioned features. An example of a graphical feature can include a colored bar or boarder associated with a rank or quality, e.g., green being indicative of a favorable streaming media sample 200 versus yellow or red that might be indicative of inferior streaming media samples 200.

In some embodiments, the tags 206 are displayed in association with their respective streaming media samples 200. Alternatively or in addition, such tags can be hidden or otherwise minimized in extent by default. A selection of the streaming media sample 200, for example by the pointer icon 202, can cause the tag to appear or to expand to provide additional information. In at least some embodiments, one or more of such presentation features can be re-configured or otherwise adjusted by way of preferences controllable by the video producer.

In some embodiments, the media management console display 132 includes a map 210 of the venue 102. The map 210 can include a simplified graphical representation identifying one or more of predefined venue regions 212 as well as relative locations of contributing spectators. In the illustrative example, the venue 102 includes four predefined venue regions 212. The map 210 can include a location icon 214, such as a dot or other suitable indicator in relation to the map 210 to provide an indication as to a position of a camera of a mobile phone 108 within the venue 102. In at least some embodiments, the number of displayed location icons 214 can be controlled by selection of streaming media samples 200 by the pointer icon 202. Otherwise, the map 210 might become unusable should too many contributors be located within any of the venue regions 212. In the illustrative example, the pointer icon 202 can be used to select a first streaming video sample 200a, corresponding to the first video camera of the first mobile phone 108a (FIG. 1), a second streaming video sample 200b, corresponding to the second video camera of the second mobile phone 108b, and a third streaming video sample 200c, corresponding to the third video camera of the third mobile phone 108c. Selection of the streaming video sample 200 can cause the location icon 214 to be displayed on the venue map 210 according to a position associated with the selected camera of the mobile phone 108. Thus, the first and second cameras of the first and second mobile phones 108a, 108b are illustrated in the second venue region, or quadrant 212, whereas the third camera of the third mobile phone 108c is depicted within the fourth venue region, or quadrant 212.

In at least some embodiments, one or more of the location icons 214 can include a distinguishable feature, such as a color, graphical or textual element (e.g., the tag 206) to allow for association of the location icon 214 with a particular one of the streaming media samples 200. Alternatively or in addition, should one of the streaming media samples 200 be selected for incorporation into the produced video program, the location icon 214 can include another indication to inform a user as to which camera is providing the broadcast content. In the illustrative example, a location icon of the second camera of the second mobile phone 108b is depicted as a "star" 216; whereas, the location icons 214 of the other cameras 108 are depicted as "circles", to indicate that video from the second camera of the second mobile phone 108b is being incorporated contemporaneously into the produced video program. When video from the second camera of the second mobile phone 108b is no longer being incorporated into the produced video program, the contributing position icon 216 can revert to a non-contributing location icon 214.

Figure 3:
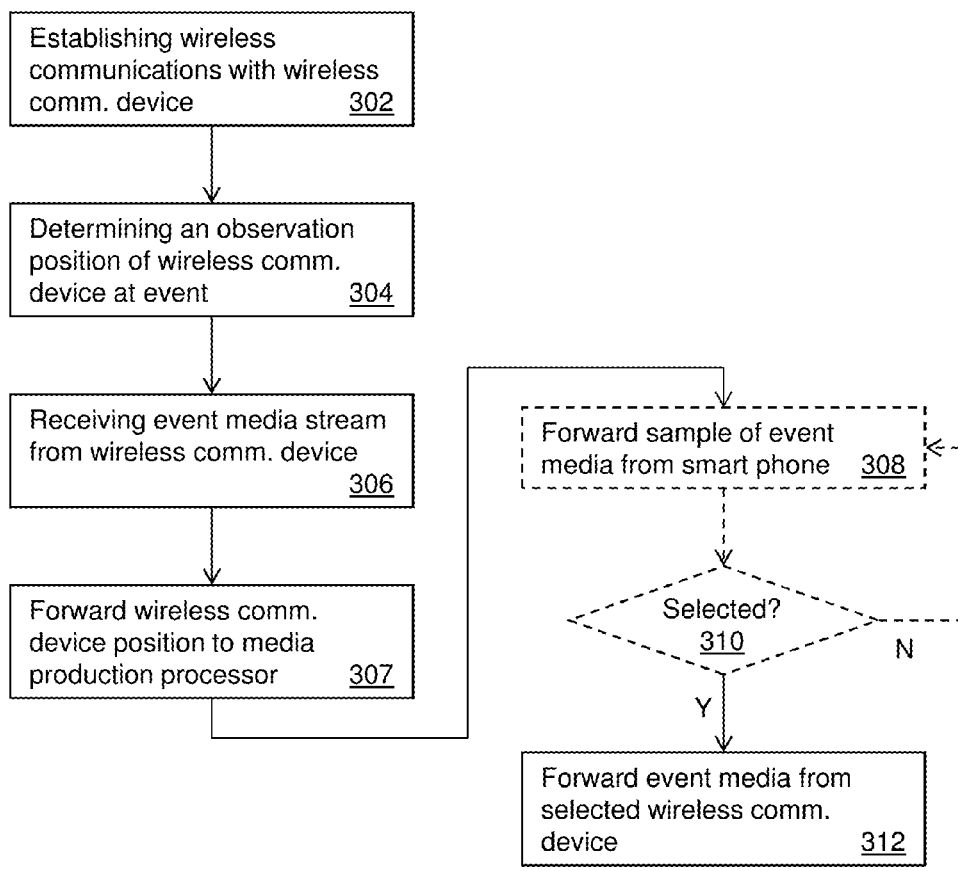
FIG. 3 depicts an illustrative embodiment of a process operating in portions of the system described in FIG. 1 and FIGS. 4-6.

FIG. 3 depicts an illustrative embodiment of a process 300 operating in portions of the systems disclosed herein. Wireless communications is established with a wireless communications device at 302. The wireless communications device can include a mobile phone 108 (FIG. 1) having a camera, such as a smart phone or feature phone of a spectator of an event 106. Communications can be established, for example by a service provider by way of a wireless access terminal 112 positioned within a venue 102 hosting the event 106. Communications service can include wireless access through other wireless access terminals 112 including base transceiver stations of a mobile cellular network. In at least some embodiments, communications with the mobile phone 108 are established by way of the wireless access terminals 112 of the venue 102, even when other wireless access terminals 112 are available. In at least some embodiments, communications with the mobile phone 108 are established by way of the wireless access terminals 112 of the venue 102 in response to a spectator's participation in a media streaming service.

Such participation can be identified, for example, by way of a mobile application resident on the spectator's mobile phone 108. Thus, the spectator might choose to launch the application while attending the event 106. The application can work cooperatively with communications equipment, such as the wireless access terminals 112, to identify the availability of such wireless access terminals 112 at the venue 102. Once identified, one or more of the application and the service provider facilities 120, alone or in combination, can establish communications through one of the wireless access terminals 112, such as a closest wireless access terminal 112, or a wireless access terminal 112 with excess communications channel capacity, or bandwidth, which might not necessarily be the closest wireless access terminal 112 to the spectator. In at least some embodiments, one or more of the wireless access terminal 112 or other elements of communications connectivity provided by the service provider facilities 120 recognizes the streaming media application and provides a suitable grade of service to reduce the possibility of interference. Such service can include a priority granted to streaming media applications over other applications. Thus, transport of streaming media, such as a video stream, can be prioritized with respect to other network traffic, such as telephone communications, messaging, and the like.

An observation position of wireless communications device associated with the camera of the mobile phone 108 at an event 106 is determined at 304. The position can be determined according to any of the techniques disclosed herein. Examples include spectator provided location, a mobile phone provided location, by way of GPS coordinates, and other automated features using triangulation by way of signals received from the spectator's mobile phone 108 by one or more of the wireless access terminals 112 at the venue 102.

A media stream including event media is received from the wireless communications device at 306. For example, a spectator by way of a video camera, audio sensor, still image camera, or some combination of such sensors, provides a streaming media signal from the wireless communications device, e.g., mobile phone 108, to the media distribution server 116 of the media service provider facilities 120. The media distribution server 116 receives the media stream, e.g., a video stream, by way of the established communications connectivity between the media distribution server 116 and the wireless device.

A position of the wireless communications device is forwarded or otherwise provided to a media production processor at 308. The position can be forwarded, for example, by way of the media distribution server 116. It is also understood that one or more of the media distribution server 116 and the media production server 122 can independently determine or otherwise estimate a position of a wireless communications device, such as a mobile phone 108 associated with a particular channel of streaming media. For example, a location or vantage point can be determined manually or automatically, e.g., through image recognition, by one or more features of event media provided within the streaming media channel.

Ultimately, the event media itself can be forwarded from at least one of the wireless communications device 108 and the media distribution 116 server at 312. Although the illustrative example presumes a relay of streaming media through a media distribution server 116 as might be operated under the control of a service provider facilities 120 it is understood that such features can be combined or otherwise collocated with the media production server 122 operated under the control of the content provider facilities 124. Thus, communications can be routed directly from the venue 102 to the content provider facilities 124, without being relayed through equipment of the service provider facilities 120.

In some embodiments, the process 300 optionally includes forward sample of event media from a smart phone (shown in phantom) and determining whether the forwarded sample of event media was selected at 310 (also shown in phantom). To the extent that the forwarded sample of event media is selected at 310, the event media is forwarded from the selected wireless communications device at 312. To the extent that the forwarded sample of event media, however, is not selected at 310, the process 300 continues with subsequent forwarding of samples of event media from the smart phones at 308.

Figure 4:
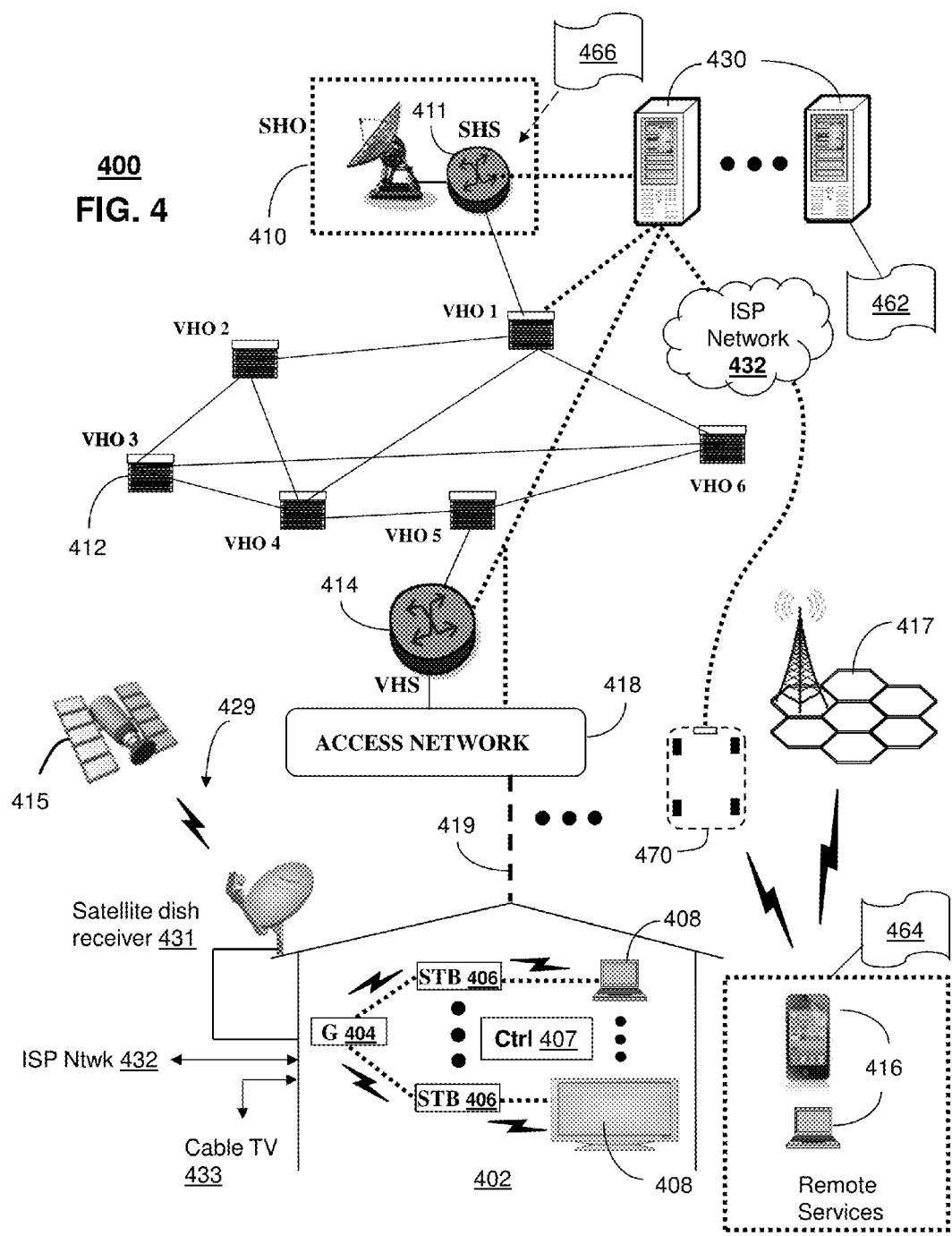
FIGS. 4-5 depict illustrative embodiments of communication systems that provide media services including delivery of streaming media from mobile devices according to the event monitoring system of FIG. 1 and FIG. 2 and the process of FIG. 3.

FIG. 4 depicts an illustrative embodiment of a first communication system 400 for delivering media content. The communication system 400 can represent an Internet Protocol Television (IPTV) media system the communication system 400 can be overlaid or operably coupled with the event monitoring system 100 (FIG. 1). A media stream including event media is received from a wireless communications device 416 located within a venue 470 hosting a monitored event 106 (FIG. 1). The event media is generated by the wireless communications device 416 from an aspect of the event 106 monitored at an observation position of a spectator in control of the wireless communications device 416. A media stream is forwarded from the wireless communications device 416, for example, by way of a service provider network 432 to a media production processor 430. Upon selection, the media production processor 430 uses the media stream to prepare media program coverage of the event 106 for subsequent broadcast.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices, such as the media production processor 430, a portion of which can operate as a web server for providing web portal services over the ISP network 432 to wireline media devices 408 or wireless communication devices 416.

Communication system 400 can also provide for all or a portion of the computing devices, such as the media production processor 430 to function as one or more of a media distribution server 116 and a media production server 122 (FIG. 1) (herein referred to as streaming media application server 430). The streaming media application server 430 can use computing and communication technology to perform function 462, which can include among other things, establishment of communications connectivity with the wireless communications device 416, processing of streaming media, for example to establish a ranking, or coordinate settings of a video compression algorithm. The media production server 122 at the super headend office 410 and wireless communication devices 416 can be provisioned with software functions 466 and 464, respectively, to utilize the services of the streaming media application server 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
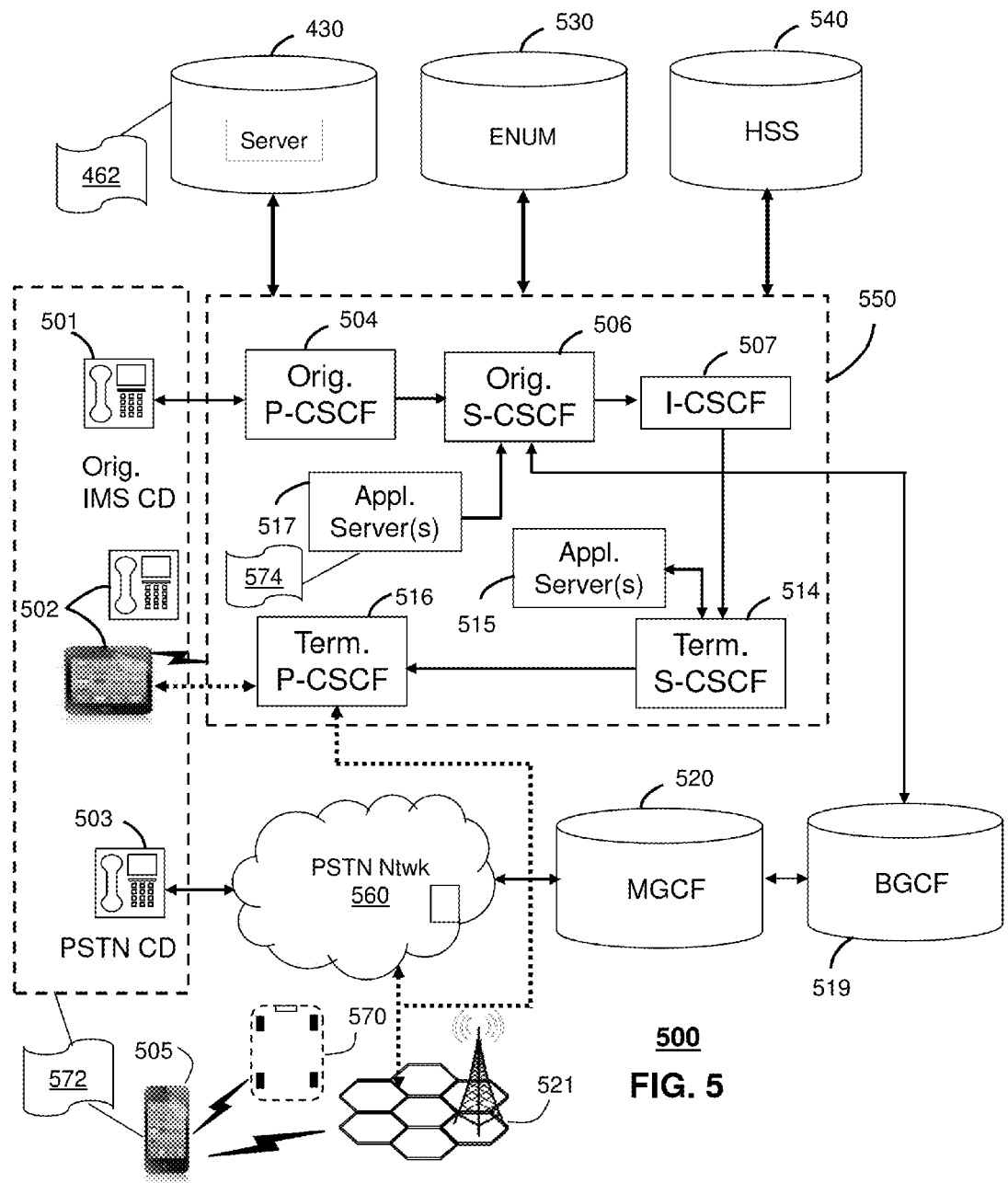

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with the event monitoring system 100 (FIG. 1) and communication system 400 as another representative embodiment of communication system 400. A media stream including event media is received from a wireless communications device 505 located within a venue 570 hosting a monitored event 106 (FIG. 1). The event media is generated by the wireless communications device 505 from an aspect of the event 106 monitored at an observation position of a spectator in control of the wireless communications device 505. A media stream is forwarded from the wireless communications device 505, for example, by way of a service provider network 560 to a media production processor 430. Upon selection, the streaming media application server 430 uses the media stream to prepare media program coverage of the event 106 for subsequent broadcast.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The streaming media application server 430 of FIG. 4 can be operably coupled to the second communication system 500 for purposes similar to those described above. The streaming media application server 430 can perform function 462, and in at least some instances, the video production functions 466 and thereby provide streaming media services to the CDs 501, 502, 503 and 505 of FIG. 5. CDs 501, 502, 503 and 505, which can be adapted with software to perform function 572 to utilize the services of the streaming media application server 430. The streaming media application server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
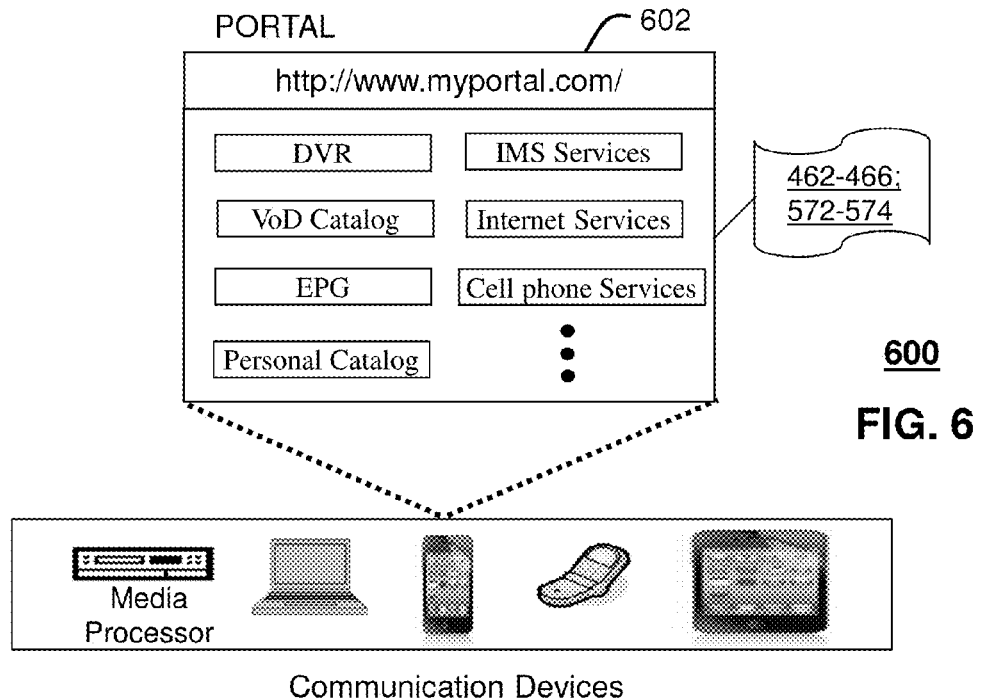
FIG. 6 depicts an illustrative embodiment of a web portal for interacting with the communication systems of the event monitoring system of FIGS. 1-2 and the process of FIG. 3.

FIG. 6 depicts an illustrative embodiment of a web portal 602 which can be hosted by server applications operating from the computing devices 430 of the event monitoring system 100 illustrated in FIG. 1. Communication system 600 can be overlaid or operably coupled with the event monitoring system 100, communication system 400, and/or communication system 500 as another representative embodiment of the event monitoring system 100 (FIG. 1), communication system 400, and/or communication system 500. A media stream including event media is received from a wireless communications device located within a venue hosting a monitored event 106 (FIG. 1). The event media is generated by the wireless communications device from an aspect of the event 106 monitored at an observation position of a spectator in control of the wireless communications device. A media stream is forwarded from the wireless communications device, for example, by way of a service provider network to a media production processor. Upon selection, the streaming media application server uses the media stream to prepare media program coverage of the event 106 for subsequent broadcast. The web portal 602 can be used for managing services of event monitoring system 100 and communication systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and service providers of communication 400-500.

Figure 7:
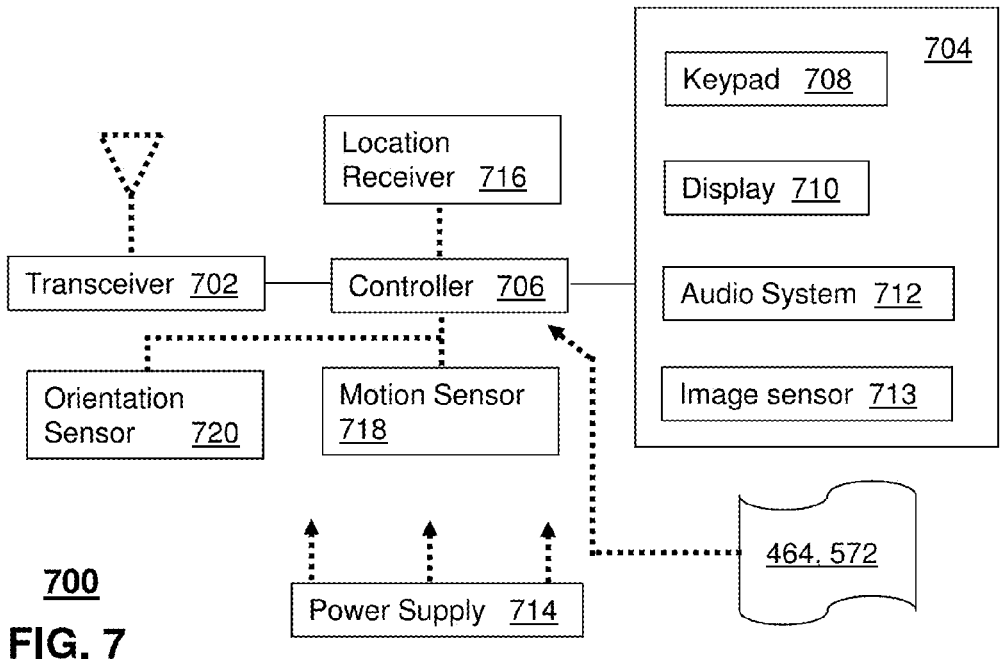
FIG. 7 depicts an illustrative embodiment of a wireless communications device.

FIG. 7 depicts an illustrative embodiment of a communication device 700. Communication device 700 can serve in whole or in part as an illustrative embodiment of the devices depicted in FIGS. 4-5. A media stream including event media is received from a wireless communications device 700 located within a venue hosting a monitored event 106 (FIG. 1). The event media is generated by the wireless communications device 700 from an aspect of the event 106 monitored at an observation position of a spectator in control of the wireless communications device 700. A media stream is forwarded from the wireless communications device 700, for example, by way of a service provider network to a media production processor. Upon selection, the media production processor uses the media stream to prepare media program coverage of the event 106 for subsequent broadcast.

To enable these features, communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access terminals by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of event monitoring system 100, the communication system 400, and the communication system 500. In addition, the controller 706 can be adapted in various embodiments to perform the functions 464 and 572, respectively. For example, the communication device 700 can facilitate or otherwise cooperate with one or more of the wireless access terminals 112 (FIG. 1) and the network service provider facilities 120 for forwarding streaming media to the media distribution server 116. The communication device performing the functions 464 and 572 can further measure or otherwise determine in cooperation with one or more of the wireless access terminals 112 and equipment of the wireless network service provider facilities 120 an estimate of communications quality, for example, by way of a channel quality indicator, a bit error rate, or other measure of communications channel quality.

The communication device performing the functions 464 and 572 can further launch an mobile application program on the communication device 700 allowing a spectator-subscriber to coordinate any of various features such as those disclosed herein in relation to the provision of streaming media, including reporting of a position of the communications device 700 and the actual streaming of media from one or more sensors of the communications device 700.

It is also understood that in at least some embodiments, the sensor, e.g., video camera, still camera, microphone, can be provided from a separate device (not shown) that is in communication with the communications device, for example, by way of a personal area network or a physical connection, such as a cable. The functions 464 and 572 can in at least some embodiments, include features, application programming interfaces, and the like to allow for communication with a separate sensor device and in some instances, allowing for control of the device, e.g., able to control record, pause features of a video camera sensor.

Upon reviewing the aforementioned embodiments, it would be evident to an artisan with ordinary skill in the art that said embodiments can be modified, reduced, or enhanced without departing from the scope of the claims described below. For example, the sensor, e.g., video camera, can be provided as a separate device in communication with a mobile application for streaming media on a mobile phone to allow for streaming of media according to the techniques disclosed herein for event media obtained by a sensor device not equipped with a streaming media application. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
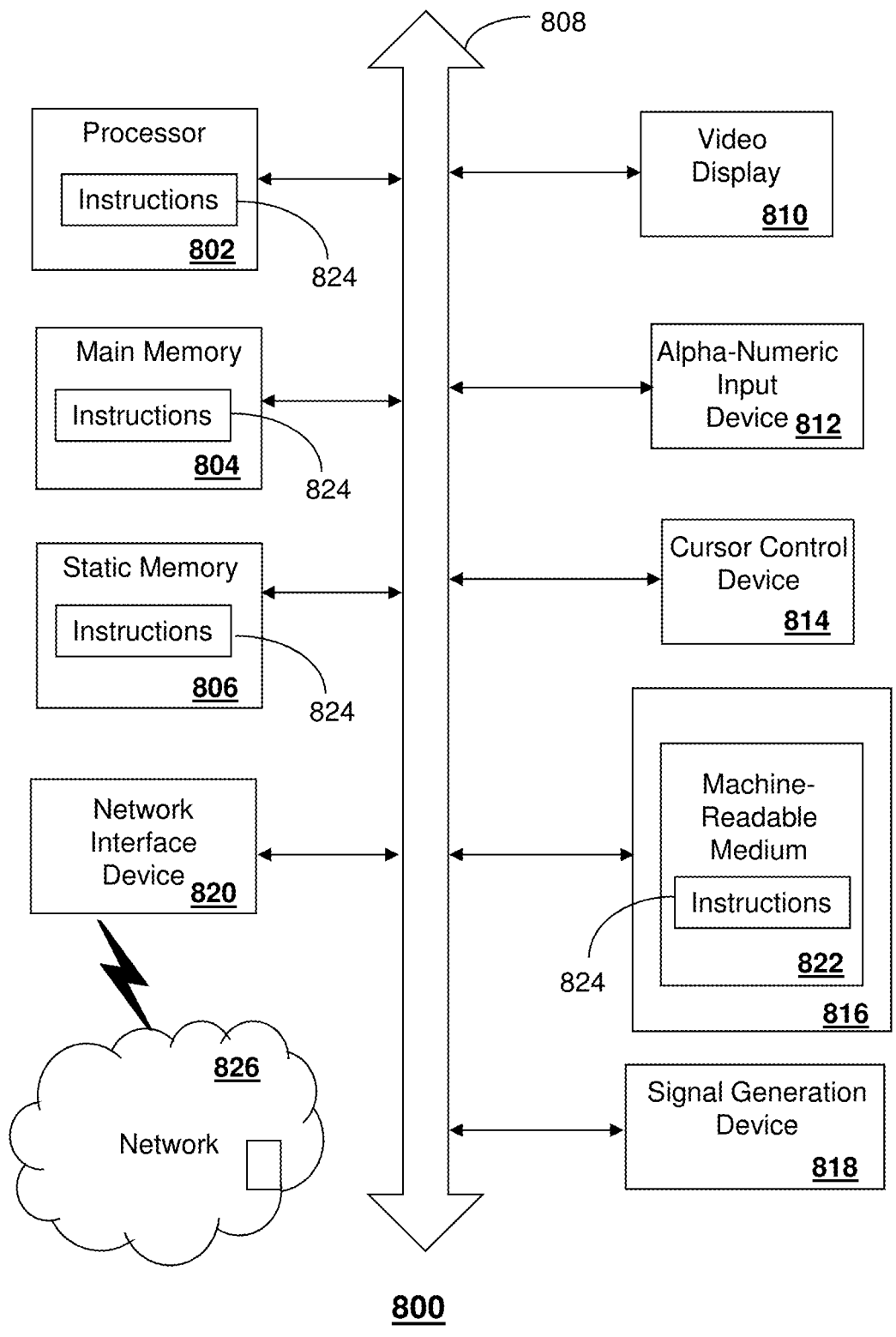
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods describe above. One or more instances of the machine can operate, for example, as the wireless communications device 108 including a camera, the wireless access terminals 112, the media distribution server 116 and the media production server 122 of FIG. 1, the media production processor 430, media processor 406, the remote service devices 416 of FIG. 4, the servers 430 and wireless communication device 505 of FIG. 6, the elements of the communications device 700 of FIG. 7, such as the controller 706, and other devices of FIGS. 1-7. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    facilitating establishment, by a system comprising a processor, of wireless communications with a mobile phone;
    determining an observation position of the mobile phone relative to an event, the mobile phone being equipped with a video camera to generate event video of the event obtained from the observation position;
    receiving, by the system, a first video stream from the mobile phone, wherein the first video stream comprises the event video;
    generating, by the system based on the event video, a second video stream comprising a low-bandwidth representation of the event video;
    providing, by the system, the second video stream to a media production processor;
    receiving, by the system from the media production processor, a selection of the second video stream;
    in response to the selection of the second video stream by the media production processor, providing, by the system to the media production processor, a third video stream comprising a high-bandwidth representation of the event video;
    providing, by the system to the media production processor, the observation position of the mobile phone; and
    determining, by the system, a ranking of the first video stream relative to other video streams comprising other event video of the event,
    wherein the ranking is determined based on applying weighting values to a plurality of criteria, wherein the plurality of criteria includes a quality of images in the first video stream and a communications channel quality,
    wherein the providing of the third video stream and the observation position causes the media production processor to generate video coverage of the event, and wherein an identification of a user of the mobile phone is included in a credit portion of the video coverage of the event responsive to the video coverage including at least a portion of the high-bandwidth representation of the event video from the third video stream.

2. The method of claim 1, wherein the establishment of the wireless communications with the mobile phone comprises:
    facilitating establishment of wireless communications with the mobile phone through a wireless access node of a plurality of wireless access nodes; and
    prioritizing transport of the first video stream with respect to other network traffic.

3. The method of claim 2, wherein the determining of the observation position of the mobile phone comprises estimating the observation position according to a location of the wireless access node with respect to the event.

4. The method of claim 1, wherein the plurality of criteria includes a monitored history of quality of event content previously provided by the mobile phone.

5. The method of claim 4, wherein generating of the second video stream comprises applying a low-resolution video compression algorithm to the first video stream.

6. The method of claim 1, wherein the third video stream is forwarded to the media production processor for use in a video program providing coverage of the event.

7. A device, comprising:
    a memory that stores computer instructions; and
    a processor coupled to the memory, wherein the processor, responsive to executing the computer instructions, performs operations comprising:
        facilitating establishment of wireless communications with a wireless communications device;
        determining an observation position of the wireless communications device relative to an event, the wireless communications device to generate event media of the event monitored from the observation position;
        receiving a first media stream from the wireless communications device, wherein the first media stream comprises the event media;
        generating, based on the event media, a second media stream comprising a low-bandwidth representation of the event media;
        providing the second media stream to a media production processor;
        receiving a selection of the second media stream from the media production processor;
        in response to the selection of the second media stream by the media production processor, providing, to the media production processor, a third media stream comprising a high-bandwidth representation of the event media;

forwarding the observation position of the wireless communications device to the media production processor; and determining a ranking for the first media stream relative to other media streams comprising other event media of the event, wherein the ranking is determined based on applying weighting values to a plurality of criteria, wherein the plurality of criteria includes a quality of images in the first media stream and a communications channel quality, wherein the providing of the third media stream and the observation position causes the media production processor to generate media coverage of the event, and wherein an identification of a user of the wireless communications device is included in a credit portion of the media coverage of the event responsive to the media coverage including at least a portion of the high-bandwidth representation of the event media from the third media stream.

8. The device of claim 7, wherein during establishment of the wireless communications with the wireless communications device, the processor performs operations comprising:

facilitating establishment of wireless communications with the wireless communications device through a wireless access node of a plurality of wireless access nodes; and prioritizing transport of the first media stream with respect to other network traffic.

9. The device of claim 8, wherein during determination of the observation position of the wireless communications device, the processor performs operations comprising estimating the observation position according to a location of the wireless access node with respect to the event.

10. The device of claim 7, wherein the first media stream comprises video.

11. The device of claim 7, wherein the processor comprises a plurality of processors operating in a distributed processing environment.

12. The device of claim 11, wherein generating of the second media stream comprises applying a low-resolution video compression algorithm to the second media stream.

13. The device of claim 7, wherein the first media stream is forwarded under direction of the processor to the media production processor for use in a media program providing coverage of the event.

14. A computer-readable storage medium, comprising computer instructions which, responsive to being executed by a processor, cause the processor to perform operations comprising:

determining an observation position of a mobile phone relative to an event, the mobile phone to generate event video of the event monitored from the observation position;

receiving a first video stream from the mobile phone, wherein the first video stream comprises the event video;

generating, based on the event video, a second video stream comprising a low-bandwidth representation of the event video;

providing the second video stream to a media production processor;

receiving a selection of the second video stream from the media production processor;

in response to the selection of the second video stream by the media production processor, providing a third video stream comprising a high-bandwidth representation of the event video to the media production processor;

providing the observation position of the mobile phone to the media production processor; and determining a ranking for the first video stream relative to other video streams comprising other event video of the event according to applying weighting values to a plurality of criteria including a quality of images in the first video stream and a communications channel quality, wherein the providing of the third video stream and the observation position causes the media production processor to generate video coverage of the event, and wherein an identification of a user of the mobile phone is included in a credit portion of the video coverage of the event responsive to the video coverage including at least a portion of the high-bandwidth representation of the event video from the third video stream.

15. The computer-readable storage medium of claim 14, wherein the operations further comprise:

facilitating establishment of wireless communications with the mobile phone through a wireless access node of a plurality of wireless access nodes; and prioritizing transport of the first video stream with respect to other network traffic.

16. The computer-readable storage medium of claim 15, wherein while determining the observation position of the mobile phone, the processor performs operations comprising estimating the observation position according to a location of the wireless access node with respect to the event.

17. The computer-readable storage medium of claim 14, wherein the operations further comprise accessing a monitored history of event content provided by the mobile phone, wherein the ranking for the first video stream is determined according to the monitored history.

18. The computer-readable storage medium of claim 14, wherein the processor comprises a plurality of processors operating in a distributed processing environment.

19. The computer-readable storage medium of claim 18, wherein generating of the second video stream comprises applying a low-bandwidth video compression algorithm to the second video stream.

* * * * *